US011885895B2

(12) United States Patent
Nam et al.

(10) Patent No.: US 11,885,895 B2
(45) Date of Patent: Jan. 30, 2024

(54) ACCESS LINK (UU) AND SIDELINK POSITIONING REFERENCE SIGNAL (PRS) PRIORITY IN SIDELINK ASSISTED POSITIONING

(71) Applicant: QUALCOMM Incorporated, San Diego, CA (US)

(72) Inventors: Wooseok Nam, San Diego, CA (US); Sony Akkarakaran, Poway, CA (US); Tao Luo, San Diego, CA (US); Yucheng Dai, San Diego, CA (US); Jingchao Bao, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 314 days.

(21) Appl. No.: 17/448,660

(22) Filed: Sep. 23, 2021

(65) Prior Publication Data

US 2023/0092211 A1  Mar. 23, 2023

(51) Int. Cl.
*G01S 5/00*  (2006.01)
*H04L 5/00*  (2006.01)
*H04W 92/18*  (2009.01)

(52) U.S. Cl.
CPC .......... *G01S 5/0036* (2013.01); *G01S 5/0072* (2013.01); *H04L 5/0048* (2013.01); *H04W 92/18* (2013.01)

(58) Field of Classification Search
CPC .... G01S 5/0036; G01S 5/0072; G01S 5/0205; G01S 5/0236; H04L 5/0048; H04W 92/18; H04W 88/04; H04W 64/00
See application file for complete search history.

(56) References Cited

U.S. PATENT DOCUMENTS 11,582,584 B2 *  2/2023  Liu ........................ H04W 4/029

FOREIGN PATENT DOCUMENTS

| WO | WO-2021035484 A1 | 3/2021 |
| WO | WO-2021155793 A1 | 8/2021 |
| WO | WO-2021167715 A1 | 8/2021 |

OTHER PUBLICATIONS

Interdigital et al., "Discussion on Latency Improvements for DL and DL+UL Positioning Methods", 3GPP TSG RAN WG1 #105-e, R1-2104874, 3rd Generation Partnership Project, Mobile Competence Centre, 650, Route Des Lucioles, F-06921 Sophia-Antipolis Cedex, France, vol. RAN WG1, No. e-Meeting, May 10, 2021-May 27, 2021, May 12, 2021, XP052011095, 3 Pages, Sections 1-3.

(Continued)

*Primary Examiner* — Kabir A Timory
(74) *Attorney, Agent, or Firm* — QUALCOMM Incorporated

(57) ABSTRACT

Systems, methods, and devices for wireless communication that support mechanisms for determining a joint priority of sidelink and access link (Uu) positioning reference signal (PRS) transmissions in a wireless communication system. A joint priority of a PRS transmission may refer to a priority of the PRS transmission over the entire set of PRS transmissions including sidelink PRS transmissions and Uu PRS transmissions transmitted to a target UE in a sidelink positioning session. In aspects, a joint priority of a sidelink PRS transmission from an anchor UE may be determined with respect to not only other sidelink transmissions, but also with respect to other Uu PRS transmissions from other anchor base stations. Similarly, a joint priority of a Uu PRS transmission from an anchor base station may be determined with respect to not only other Uu transmissions, but also with respect to other sidelink PRS transmissions from other anchor UEs.

28 Claims, 10 Drawing Sheets

(56) References Cited

OTHER PUBLICATIONS

International Search Report and Written Opinion—PCT/US2022/074153—ISA/EPO—dated Nov. 2, 2022.
Moderator (Intel Corporation) et al., "Feature Lead Summary for NR Positioning Maintenance AI 7.2.8", 3GPP TSG RAN WG1 Meeting #102-E, R1-2006996, 3rd Generation Partnership Project, Mobile Competence Centre, 650, Route Des Lucioles, F-06921 Sophia- Antipolis Cedex, France, vol. RAN WG1. No. e-Meeting, Aug. 17, 2020-Aug. 28, 2020, Aug. 22, 2020, XP051921226, 22 Pages, pp. 1-3, section 2, Aspect 1.

* cited by examiner

ACCESS LINK (UU) AND SIDELINK POSITIONING REFERENCE SIGNAL (PRS) PRIORITY IN SIDELINK ASSISTED POSITIONING

TECHNICAL FIELD

Aspects of the present disclosure relate generally to wireless communication systems, and more particularly, to priority determination of positioning reference signals in sidelink-assisted positioning.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks may be multiple access networks that support communications for multiple users by sharing the available network resources.

A wireless communication network may include several components. These components may include wireless communication devices, such as base stations (or node Bs) that may support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on a downlink to a UE or may receive data and control information on an uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication performed by a user equipment (UE) includes receiving positioning assistance information including configuration for a plurality of positioning reference signal (PRS) transmissions to be received by the UE from a plurality of anchor nodes over one or more of an access link (Uu) or a sidelink. In aspects, the positioning assistance information includes a joint priority indication for each PRS transmission of the plurality of PRS transmissions, the joint priority indication of a PRS transmission indicating a priority of the PRS transmission with respect to other PRS transmissions of the plurality of PRS transmissions. The method further includes receiving the plurality of PRS transmissions from the plurality of anchor nodes, performing measurements on one or more PRS transmissions of the plurality of PRS transmissions in an order based on the joint priority indication for each PRS transmission, and transmitting the measurement to a location server for determination of a position of the UE.

In an additional aspect of the disclosure, a method of wireless communication performed by a UE includes determining a joint priority for a PRS transmission to be transmitted by the UE to a target UE over a sidelink, the joint priority for the PRS transmission indicating a priority of the PRS transmission with respect to other PRS transmissions to be received by the target UE from a plurality of anchor nodes over one or more of the sidelink or a Uu link, and transmitting, to the target UE, positioning assistance information including configuration for the PRS transmission to be transmitted by the UE to the target UE over the sidelink. In aspects, the positioning assistance information includes a joint priority indication indicating the joint priority determined for the PRS transmission.

In an additional aspect of the disclosure, a method of wireless communication performed by a base station includes receiving an indication of positioning capabilities of a plurality of anchor nodes configured for transmitting a plurality of PRS transmissions to a target UE over one or more of a Uu link or a sidelink, obtaining a joint priority for each PRS transmission of the plurality of PRS transmissions based on the positioning capabilities of each anchor node of the plurality of anchor nodes, the joint priority indicating of a PRS transmission indicating a priority of the PRS transmission with respect to other PRS transmissions of the plurality of PRS transmissions, and transmitting positioning assistance information including the joint priority for each PRS transmission of the plurality of PRS transmissions to the target UE.

In an additional aspect of the disclosure, a UE includes at least one processor and a memory coupled to the at least one processor. The at least one processor stores processor-readable code that, when executed by the at least one processor, is configured to perform operations including receiving positioning assistance information including configuration for a plurality of PRS transmissions to be received by the UE from a plurality of anchor nodes over one or more of a Uu link or a sidelink. In aspects, the positioning assistance information includes a joint priority indication for each PRS transmission of the plurality of PRS transmissions, the joint priority indication of a PRS transmission indicating a priority of the PRS transmission with respect to other PRS transmissions of the plurality of PRS transmissions. The operations further include receiving the plurality of PRS transmissions from the plurality of anchor nodes, performing measurements on one or more PRS transmissions of the plurality of PRS transmissions in an order based on the joint priority indication for each PRS transmission, and transmitting the measurement to a location server for determination of a position of the UE.

In an additional aspect of the disclosure, a UE includes at least one processor and a memory coupled to the at least one processor. The at least one processor stores processor-readable code that, when executed by the at least one processor, is configured to perform operations including determining a joint priority for a PRS transmission to be transmitted by the UE to a target UE over a sidelink, the joint priority for the PRS transmission indicating a priority of the PRS transmission with respect to other PRS transmissions to be received by the target UE from a plurality of anchor nodes over one or more of the sidelink or a Uu link, and transmitting, to the target UE, positioning assistance information including configuration for the PRS transmission to be transmitted by the UE to the target UE over the sidelink. In aspects, the positioning assistance information includes a joint priority indication indicating the joint priority determined for the PRS transmission.

In an additional aspect of the disclosure, a base station includes at least one processor and a memory coupled to the at least one processor. The at least one processor stores processor-readable code that, when executed by the at least one processor, is configured to perform operations including receiving an indication of positioning capabilities of a plurality of anchor nodes configured for transmitting a plurality of PRS transmissions to a target UE over one or more of a Uu link or a sidelink, obtaining a joint priority for each PRS transmission of the plurality of PRS transmissions based on the positioning capabilities of each anchor node of the plurality of anchor nodes, the joint priority indicating of a PRS transmission indicating a priority of the PRS transmission with respect to other PRS transmissions of the plurality of PRS transmissions, and transmitting positioning assistance information including the joint priority for each PRS transmission of the plurality of PRS transmissions to the target UE.

In an additional aspect of the disclosure, a non-transitory computer-readable medium stores instructions that, when executed by a processor, cause the processor to perform operations. The operations include receiving, by a UE, positioning assistance information including configuration for a plurality of PRS transmissions to be received by the UE from a plurality of anchor nodes over one or more of a Uu link or a sidelink. In aspects, the positioning assistance information includes a joint priority indication for each PRS transmission of the plurality of PRS transmissions, the joint priority indication of a PRS transmission indicating a priority of the PRS transmission with respect to other PRS transmissions of the plurality of PRS transmissions. The operations further include receiving the plurality of PRS transmissions from the plurality of anchor nodes, performing measurements on one or more PRS transmissions of the plurality of PRS transmissions in an order based on the joint priority indication for each PRS transmission, and transmitting the measurement to a location server for determination of a position of the UE.

In an additional aspect of the disclosure, a non-transitory computer-readable medium stores instructions that, when executed by a processor, cause the processor to perform operations. The operations include determining, by a UE, a joint priority for a PRS transmission to be transmitted by the UE to a target UE over a sidelink, the joint priority for the PRS transmission indicating a priority of the PRS transmission with respect to other PRS transmissions to be received by the target UE from a plurality of anchor nodes over one or more of the sidelink or a Uu link, and transmitting, to the target UE, positioning assistance information including configuration for the PRS transmission to be transmitted by the UE to the target UE over the sidelink. In aspects, the positioning assistance information includes a joint priority indication indicating the joint priority determined for the PRS transmission.

In an additional aspect of the disclosure, a non-transitory computer-readable medium stores instructions that, when executed by a processor, cause the processor to perform operations. The operations include receiving, by a base station, an indication of positioning capabilities of a plurality of anchor nodes configured for transmitting a plurality of PRS transmissions to a target UE over one or more of a Uu link or a sidelink, obtaining a joint priority for each PRS transmission of the plurality of PRS transmissions based on the positioning capabilities of each anchor node of the plurality of anchor nodes, the joint priority indicating of a PRS transmission indicating a priority of the PRS transmission with respect to other PRS transmissions of the plurality of PRS transmissions, and transmitting positioning assistance information including the joint priority for each PRS transmission of the plurality of PRS transmissions to the target UE.

In an additional aspect of the disclosure, an apparatus includes means for receiving, by a UE, positioning assistance information including configuration for a plurality of PRS transmissions to be received by the UE from a plurality of anchor nodes over one or more of a Uu link or a sidelink. In aspects, the positioning assistance information includes a joint priority indication for each PRS transmission of the plurality of PRS transmissions, the joint priority indication of a PRS transmission indicating a priority of the PRS transmission with respect to other PRS transmissions of the plurality of PRS transmissions. The apparatus further includes means for receiving the plurality of PRS transmissions from the plurality of anchor nodes, means for performing measurements on one or more PRS transmissions of the plurality of PRS transmissions in an order based on the joint priority indication for each PRS transmission, and means for transmitting the measurement to a location server for determination of a position of the UE.

In an additional aspect of the disclosure, an apparatus includes means for determining, by a UE, a joint priority for a PRS transmission to be transmitted by the UE to a target UE over a sidelink, the joint priority for the PRS transmission indicating a priority of the PRS transmission with respect to other PRS transmissions to be received by the target UE from a plurality of anchor nodes over one or more of the sidelink or a Uu link, and means for transmitting, to the target UE, positioning assistance information including configuration for the PRS transmission to be transmitted by the UE to the target UE over the sidelink. In aspects, the positioning assistance information includes a joint priority indication indicating the joint priority determined for the PRS transmission.

In an additional aspect of the disclosure, an apparatus includes means for receiving, by a base station, an indication of positioning capabilities of a plurality of anchor nodes configured for transmitting a plurality of PRS transmissions to a target UE over one or more of a Uu link or a sidelink, means for obtaining a joint priority for each PRS transmission of the plurality of PRS transmissions based on the positioning capabilities of each anchor node of the plurality of anchor nodes, the joint priority indicating of a PRS transmission indicating a priority of the PRS transmission with respect to other PRS transmissions of the plurality of PRS transmissions, and means for transmitting positioning assistance information including the joint priority for each PRS transmission of the plurality of PRS transmissions to the target UE.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, aspects and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described aspects. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Like reference numbers and designations in the various drawings indicate like elements.

DETAILED DESCRIPTION

Figure 1:
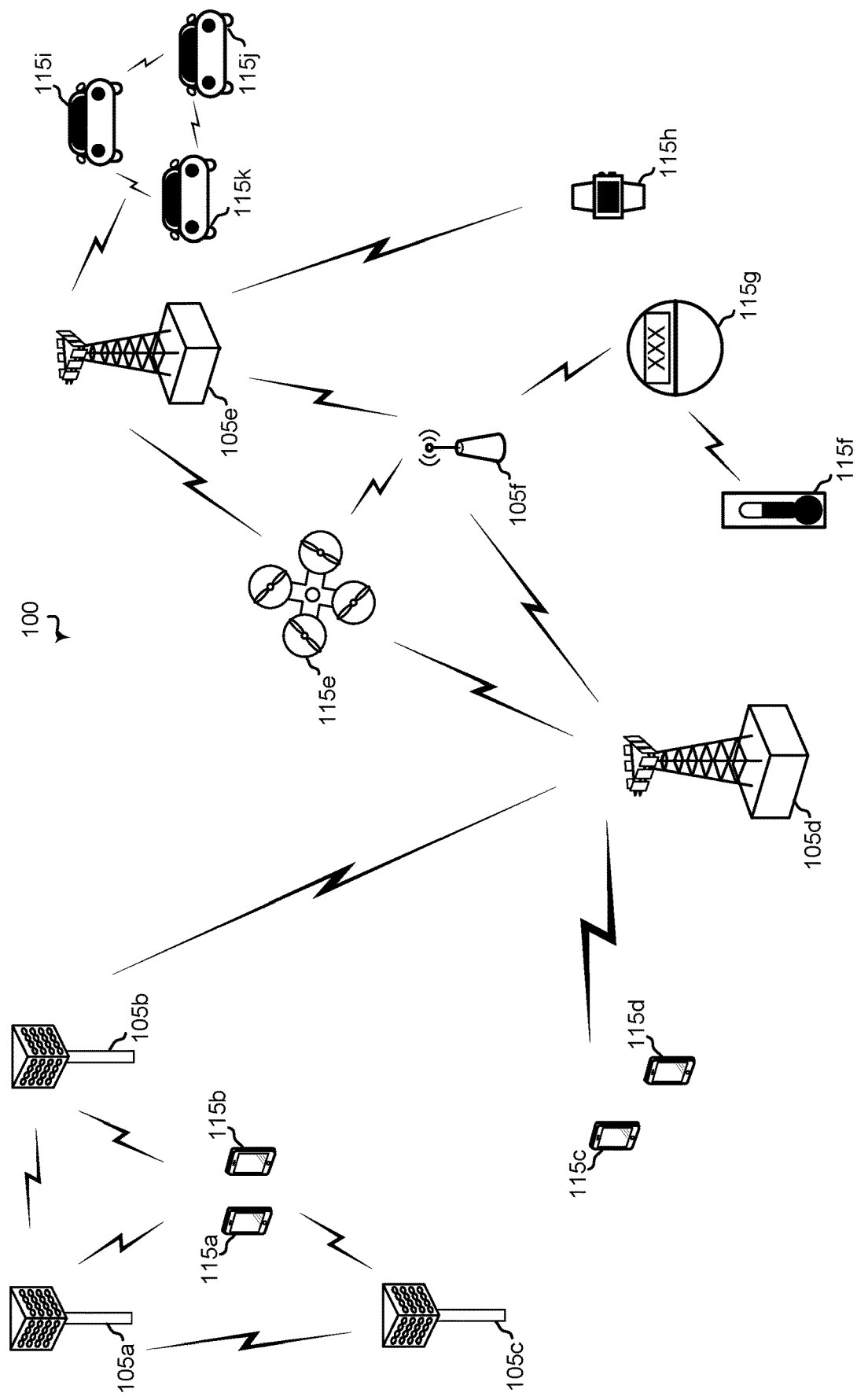
FIG. 1 is a block diagram illustrating details of an example wireless communication system according to one or more aspects.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless devices in one or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks (sometimes referred to as "5G NR" networks, systems, or devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. Additionally, an operator network may also include one or more LTE networks, or one or more other networks. The various different network types may use different radio access technologies (RATs) and RANs.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP LTE is a 3GPP project which was aimed at improving UMTS mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects described with reference to one technology may be understood to be applicable to another technology. Additionally, one or more aspects of the present disclosure may be related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" (mmWave) band in documents and articles, despite being different from the extremely high frequency (EHF) band (30 GHz-300 GHz) which is identified by the International Telecommunications Union (ITU) as a "mmWave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) design or frequency division duplex (FDD) design; and advanced wireless technologies, such as massive multiple input, multiple output (MIMO), robust mmWave transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD or TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail devices or purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution.

FIG. 1 is a block diagram illustrating details of an example wireless communication system according to one or more aspects. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" may refer to this particular geographic coverage area of a base station or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as a UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component, vehicular device, or vehicular module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an IoT or "Internet of everything" (IoE) device such as an automotive or other transportation vehicle, a satellite radio, a global positioning system (GPS) device, a global navigation satellite system (GNSS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the implementation illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. UEs may operate as base stations or other network nodes in some scenarios. Backhaul communication between base stations of wireless network 100 may occur using wired or wireless communication links.

In operation at wireless network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD communications or low-latency FDD communications, such as in a vehicle-to-vehicle (V2V) mesh network between UEs 115i-115k communicating with macro base station 105e.

Figure 2:
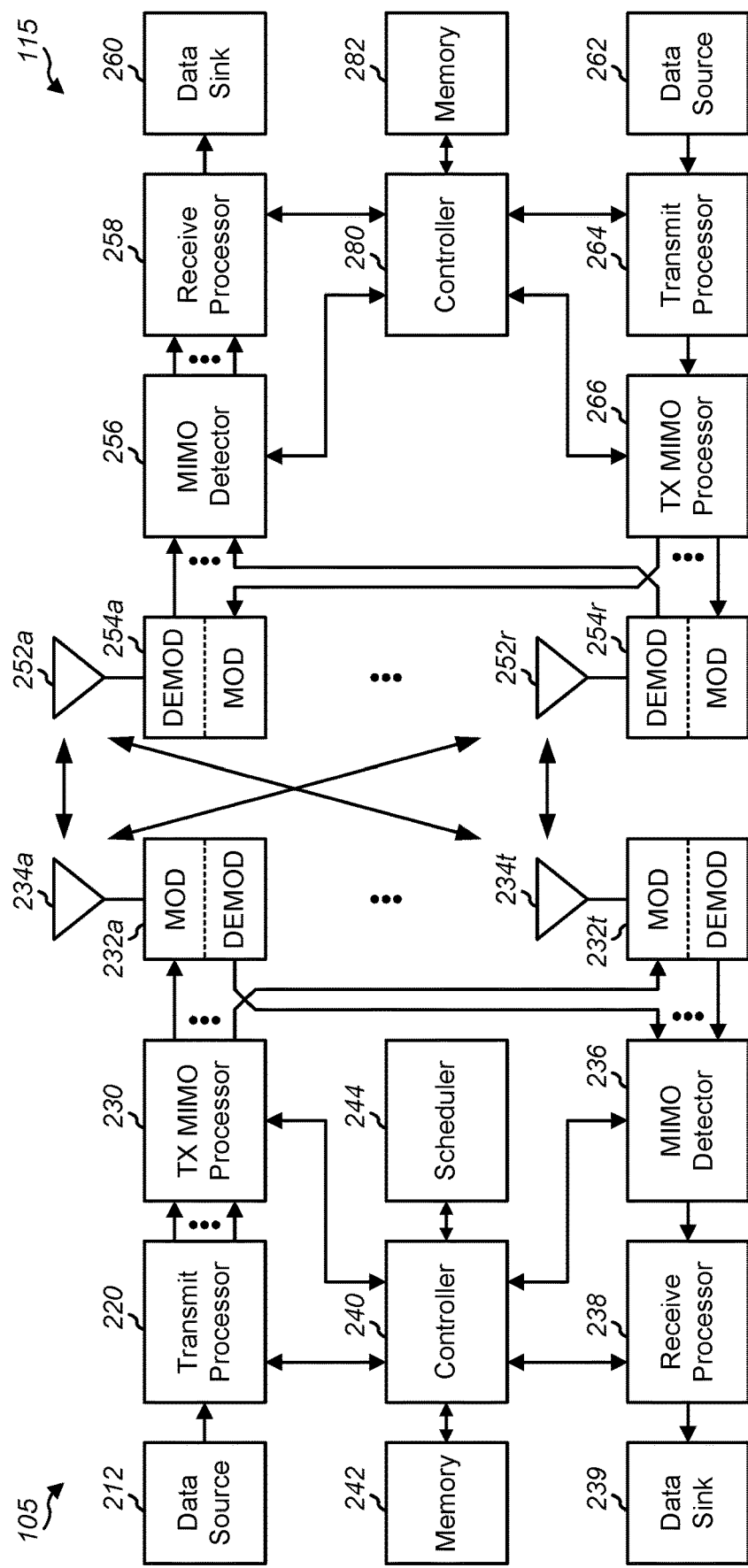
FIG. 2 is a block diagram illustrating examples of a base station and a user equipment (UE) according to one or more aspects.

FIG. 2 is a block diagram illustrating examples of base station 105 and UE 115 according to one or more aspects. Base station 105 and UE 115 may be any of the base stations and one of the UEs in FIG. 1. For a restricted association scenario (as mentioned above), base station 105 may be small cell base station 105f in FIG. 1, and UE 115 may be UE 115c or 115d operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At base station 105, transmit processor 220 may receive data from data source 212 and control information from controller 240, such as a processor. The control information may be for a physical broadcast channel (PBCH), a physical control format indicator channel (PCFICH), a physical hybrid-ARQ (automatic repeat request) indicator channel (PHICH), a physical downlink control channel (PDCCH), an enhanced physical downlink control channel (EPDCCH), an MTC physical downlink control channel (MPDCCH), etc. The data may be for a physical downlink shared channel (PDSCH), etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) MIMO processor 230 may perform spatial processing (e.g., precoding) on the data symbols, the control symbols, or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, antennas 252a through 252r may receive the downlink signals from base station 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller 280, such as a processor.

On the uplink, at UE 115, transmit processor 264 may receive and process data (e.g., for a physical uplink shared channel (PUSCH)) from data source 262 and control information (e.g., for a physical uplink control channel (PUCCH)) from controller 280. Additionally, transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to data sink 239 and the decoded control information to controller 240.

Controllers 240 and 280 may direct the operation at base station 105 and UE 115, respectively. Controller 240 or other processors and modules at base station 105 or controller 280 or other processors and modules at UE 115 may perform or direct the execution of various processes for the techniques described herein, such as to perform or direct the execution illustrated in FIGS. 5-7, or other processes for the techniques described herein. Memories 242 and 282 may store data and program codes for base station 105 and UE 115, respectively. Scheduler 244 may schedule UEs for data transmission on the downlink or the uplink.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen-before-talk or listen-before-transmitting (LBT) procedure such as a clear channel assessment (CCA) prior to communicating in order to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel or the acknowledge/negative-acknowledge (ACK/NACK) feedback for its own transmitted packets as a proxy for collisions.

Existing wireless communication systems rely on a position or location of user equipment (UE) within the network when providing communication services. In sidelink communication implementations, sidelink positioning techniques may enhance any legacy and or traditional positioning approaches. In these implementations, a target UE may receive positioning reference signals (PRS) over an access link (Uu) from one or more anchor base stations and/or over a sidelink from one or more anchor UEs. In some implementations, a PRS may include any of a PRS, a cell specific reference signal (CRS), a sounding reference signal (SRS), a demodulation reference signal (DMRS), etc. A position or location of the target UE may then be determined based on measurements of the PRS received from the one or more base stations and/or the one or more anchor UEs. As used herein, a target UE may be a UE for which a position estimation is to be performed or determined, an anchor UE (e.g., also referred to as an assisting UE or a relay UE) may be a UE whose position is known (or can be known) to the anchor UE. In some implementations, the anchor UE may have a sidelink connection with the target UE (or in some cases a sidelink connection with another anchor UE that has a sidelink connection with the target UE), and/or may have a direct uplink with a base station. Furthermore, as used herein, positioning services may include facilitating a position estimation such as by transmission and/or reception of a PRS, and/or measurements on the PRS to facilitate the position estimation.

In these implementations in which PRS is received by the target UE over Uu links and/or sidelinks, a target UE may experience poor channel conditions. For example, the target UE may be in a scenario or environment in which the probability of a clear line of sight (LOS) link (e.g., Uu link or sidelink with a clear LOS) is low. Such scenarios may include an indoor environments (such as an indoor factory environment) in which an LOS link may have a low probability of being achieved (e.g., due to the large amount of obstacles present). In these cases, increasing the number of LOS links (e.g., LOS Uu links and/or LOS sidelinks) may increase the channel conditions and may improve the position detection at a target UE, as PRS transmissions are much more likely to be received accurately at the target UE over the LOS links, and a greater amount of received PRS transmissions increases the chances of accurately determining the position of the target UE.

In some cases, a target UE may experience good channel conditions. In these cases, the overall accuracy of position detection by the target UE is improved, such as by being able to perform additional measurements. Accurate sidelink positioning may provide many benefits, such as enabling power efficient peer-to-peer positioning/ranging for public safety and/or other uses, and/or improving the determination of relative positions of a group of devices that go in and out of coverage.

In implementations, a priority may be associated with PRS transmissions received by a target UE over the Uu from anchor base stations. For example, a location server (e.g., a server configured to assist a target UE to determine a location of the target UE, such as by performing location management functions including receiving reports of PRS measurements from a target UE and performing location and/or position determinations of the target UE based on the PRS measurements), may provide the target UE with an order of priority associated with a plurality of anchor base stations (e.g., neighboring cells) of the target UE. The order of priority may specify an order in which the target UE is to measure (and/or report the measurements of) the PRS transmissions received from the plurality of anchor base stations. For example, where a first base station is prioritized higher than a second base station, the target UE may measure the PRS (and/or report the measurement) of a PRS received from the first base station before measuring the PRS (and/or reporting the measurement) of a PRS received from the second base station, as the first station is prioritized higher than the second base station. In some implementations, for each positioning frequency layer, the base stations may be indicated as sorted in a decreasing order of priority in an information element (e.g., IE OTDOA-NeighbourCellInfo-List). In implementations, the process for determining the priority of the different base stations may be left to the location server implementation. The target UE may then provide the measurements of the PRS transmissions received from the different base stations in an order based on the priority provided by the location server.

Currently, there exists no mechanism for associating a priority with PRS transmissions received by a target UE over a sidelink from anchor UEs. Although a priority of a sidelink PRS transmission has been recently proposed, the proposed priority of the sidelink PRS is used as an indicator of reliability of the sidelink PRS, rather than a priority to be used in the order in which the sidelink PRS transmissions are to be measured and/or reported by a target UE. In this proposal, the target UE may prioritize the measurement of high-priority sidelink PRS transmissions in order to improve the accuracy of the positioning determination.

However, in sidelink implementations, a target UE may receive PRS transmissions from anchor UEs over the sidelink and from anchor base stations over Uu, and there currently is no mechanisms for establishing and/or determining a priority of the PRS transmissions over the whole set including the sidelink and Uu.

Various aspects of the present disclosure are directed to systems and methods that support mechanisms for determining a joint priority of sidelink and access link PRS transmissions in a wireless communication system. As used herein, a joint priority of sidelink and access link (Uu) PRS transmissions may refer to a priority of the various PRS transmissions determined over the entire set of PRS transmissions including the sidelink PRS transmissions (e.g., PRS transmissions from anchor UEs over the sidelink) and the Uu PRS transmissions (e.g., PRS transmissions from anchor base stations over Uu) transmitted to a target UE in a sidelink positioning session (e.g., an LTE positioning protocol (LPP) session). For example, a joint priority of a sidelink PRS transmission from an anchor UE may be determined where the joint priority is a priority of the sidelink PRS transmission with respect to not only other sidelink transmissions from other anchor UEs, but also with respect to other Uu PRS transmissions from other anchor base stations. Similarly, in an example, a joint priority of a Uu PRS transmission from an anchor base station may be determined where the joint priority is a priority of the Uu PRS transmission with respect to not only other Uu transmissions from other anchor base stations, but also with respect to other sidelink PRS transmissions from other anchor UEs.

Figure 3:
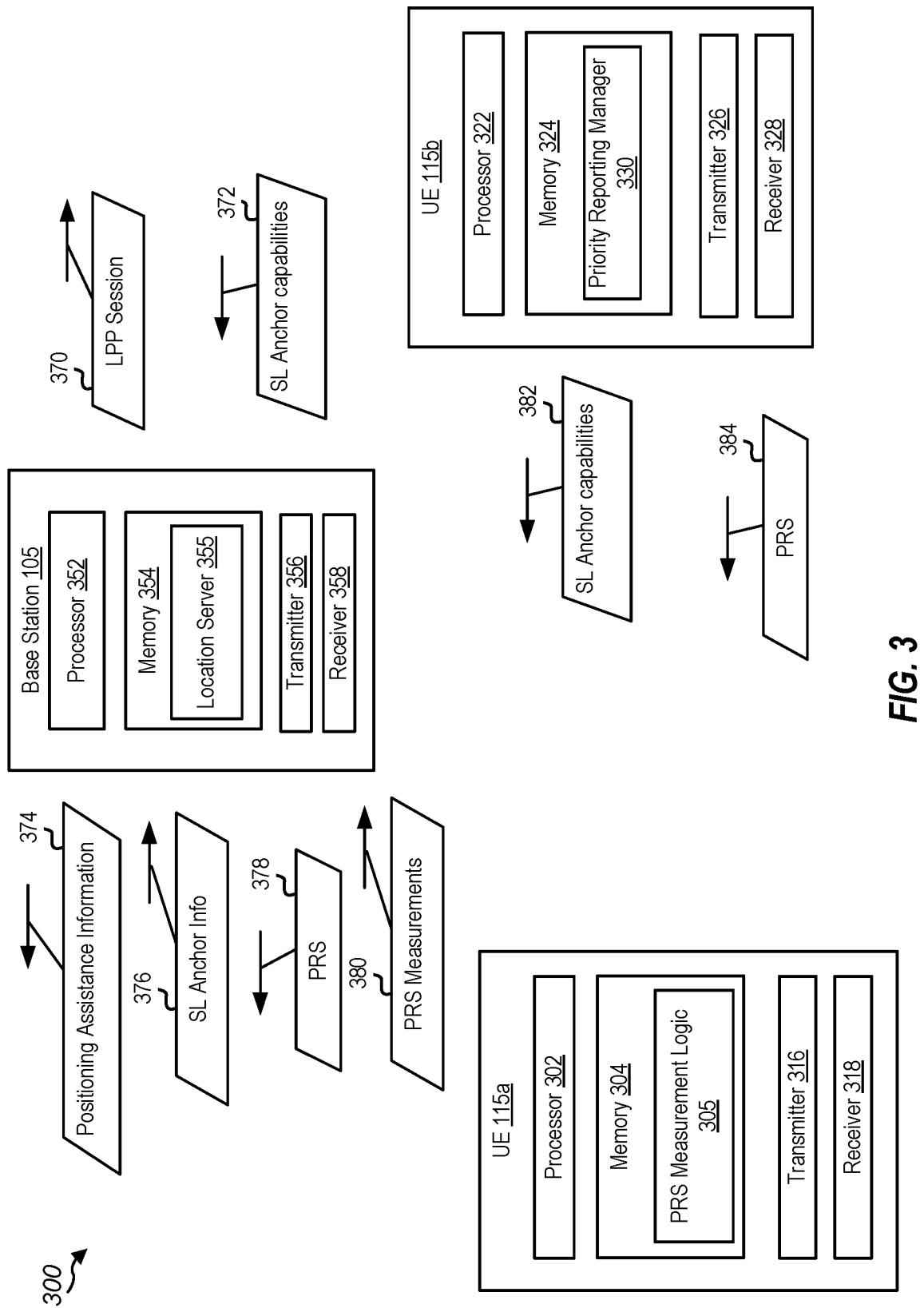
FIG. 3 is a block diagram illustrating an example wireless communication system that supports mechanisms for determining a joint priority of sidelink and access link PRS transmissions according to one or more aspects.

FIG. 3 is a block diagram of an example wireless communications system 300 that supports mechanisms for determining a joint priority of sidelink and access link PRS transmissions in a wireless communication system according to one or more aspects of the present disclosure. In some examples, wireless communications system 300 may implement aspects of wireless network 100. Wireless communications system 300 includes UE 115a, UE 115b, and base station 105, and may implement a sidelink communication scheme that may include a sidelink positioning scheme. In aspects, UE 115a and UE 115b may be in communication over a sidelink. In some aspects, UE 115a and UE 115b may also each be in communication with base station 105. In the discussion that follows, UE 115a may be described as a target UE and UE 115b may be described as an anchor UE, and in this context, PRS transmissions between the UEs may be for estimating a position of UE 115a. However, it should be noted that, the techniques for determining a joint priority of sidelink and access link PRS transmissions may apply equally when UE 115b is the node requesting and/or receiving the PRS transmissions from UE 115a. As such, the description herein should not be construed as limiting in any way. Also, it is noted that the description of system 300 as including two UEs and one base station, is merely for illustrative purposes and not intended to be limiting in any way. As such, wireless communications system 300 may generally include additional UEs, and may include more than one base station 105.

UE 115a may include a variety of components (such as structural, hardware components) used for carrying out one or more functions described herein. For example, these components may include one or more processors 302 (hereinafter referred to collectively as "processor 302"), one or more memory devices 304 (hereinafter referred to collectively as "memory 304"), one or more transmitters 316 (hereinafter referred to collectively as "transmitter 316"), and one or more receivers 318 (hereinafter referred to collectively as "receiver 318"). Processor 302 may be configured to execute instructions stored in memory 304 to perform the operations described herein. In some implementations, processor 302 includes or corresponds to one or more of receive processor 258, transmit processor 264, and controller 280, and memory 304 includes or corresponds to memory 282.

Memory 304 includes or is configured to store PRS measurement logic 305. In aspects, PRS measurement logic 305 may be configured to perform operations for performing measurements on PRS transmissions received from anchor UEs over a sidelink and/or from anchor base stations over Uu based on a joint priority of each of the PRS transmissions in accordance with aspects of the present disclosure.

Transmitter 316 is configured to transmit reference signals, control information and data to one or more other devices, and receiver 318 is configured to receive references signals, synchronization signals, control information and data from one or more other devices. For example, transmitter 316 may transmit signaling, control information and data to, and receiver 318 may receive signaling, control information and data from, base station 105. In some implementations, transmitter 316 and receiver 318 may be integrated in one or more transceivers. Additionally or alternatively, transmitter 316 or receiver 318 may include or correspond to one or more components of UE 115 described with reference to FIG. 2.

UE 115b also may include a variety of components (such as structural, hardware components) used for carrying out one or more functions described herein. For example, these components may include one or more processors 322 (hereinafter referred to collectively as "processor 322"), one or more memory devices 324 (hereinafter referred to collectively as "memory 324"), one or more transmitters 326 (hereinafter referred to collectively as "transmitter 326"), and one or more receivers 328 (hereinafter referred to collectively as "receiver 328"). Processor 322 may be configured to execute instructions stored in memory 324 to perform the operations described herein. In some implementations, processor 322 includes or corresponds to one or more of receive processor 258, transmit processor 264, and controller 280, and memory 324 includes or corresponds to memory 282.

Memory 324 includes or is configured to store priority reporting manager 330. In aspects, priority reporting manager 330 may be configured to perform operations for reporting positioning capabilities of UE 115b (e.g., capabilities of UE 115 to operate as an anchor UE) to location server 355, target UE 115a, or a hub (not shown), and/or for determining a priority for PRS transmissions to UE 115a (e.g., based on a preconfigured rule) in accordance with aspects of the present disclosure.

Transmitter 326 is configured to transmit reference signals, control information and data to one or more other devices, and receiver 328 is configured to receive references signals, synchronization signals, control information and data from one or more other devices. For example, transmitter 326 may transmit signaling, control information and data to, and receiver 328 may receive signaling, control information and data from, base station 105. In some implementations, transmitter 326 and receiver 328 may be integrated in one or more transceivers. Additionally or alternatively, transmitter 326 or receiver 328 may include or correspond to one or more components of UE 115 described with reference to FIG. 2.

Base station 105 may include a variety of components (such as structural, hardware components) used for carrying out one or more functions described herein. For example, these components may include one or more processors 352 (hereinafter referred to collectively as "processor 352"), one or more memory devices 354 (hereinafter referred to collectively as "memory 354"), one or more transmitters 356 (hereinafter referred to collectively as "transmitter 356"), and one or more receivers 358 (hereinafter referred to collectively as "receiver 358"). Processor 352 may be configured to execute instructions stored in memory 354 to perform the operations described herein. In some implementations, processor 352 includes or corresponds to one or more of receive processor 238, transmit processor 220, and controller 240, and memory 354 includes or corresponds to memory 242.

In some aspects, memory 354 includes or is configured to store location server 355. Location server 355 may be configured to perform operations related to determining a location and/or position of a target UE (e.g., target UE 115a). In aspects, location server 355 may be, e.g., a location management function (LMF). In aspects, location server 355 may receive location service requests (e.g., an LPP request) and may perform an LPP session in order to configure PRS transmissions to/from the target UE, and using the information obtained from PRS transmission measurements, location server 355 may determine a location and/or position of the target UE. Although location server 355 is illustrated as part of base station 105, in some implementations, location server 355 may be a separate component from base station 105, and communications with location server 355 may be via base station 105. For example, an anchor UE reporting capabilities, or a target UE reporting PRS measurements may communicate with location server 355 via base station 105. In a similar manner, location server 355 may communicate with other nodes via base station 105.

Transmitter 356 is configured to transmit reference signals, synchronization signals, control information and data to one or more other devices, and receiver 358 is configured to receive reference signals, control information and data from one or more other devices. For example, transmitter 356 may transmit signaling, control information and data to, and receiver 358 may receive signaling, control information and data from, UE 115. In some implementations, transmitter 356 and receiver 358 may be integrated in one or more transceivers. Additionally or alternatively, transmitter 356 or receiver 358 may include or correspond to one or more components of base station 105 described with reference to FIG. 2.

In some implementations, wireless communications system 300 implements a 5G NR network. For example, wireless communications system 300 may include multiple 5G-capable UEs 115 and multiple 5G-capable base stations 105, such as UEs and base stations configured to operate in accordance with a 5G NR network protocol such as that defined by the 3GPP.

Figure 4A:
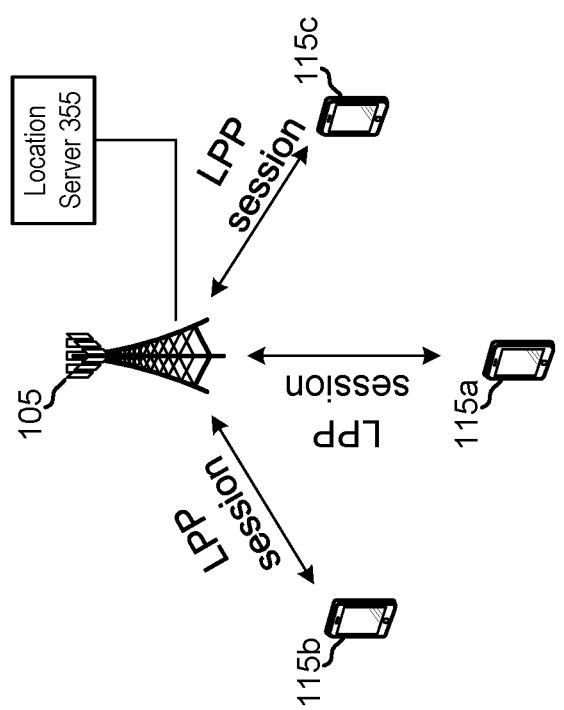
FIG. 4A is a block diagram illustrating an example of determining a joint priority of sidelink and access link PRS transmissions when all anchor UEs are in coverage of a base station in accordance with aspects of the present disclosure.
Figure 4C:
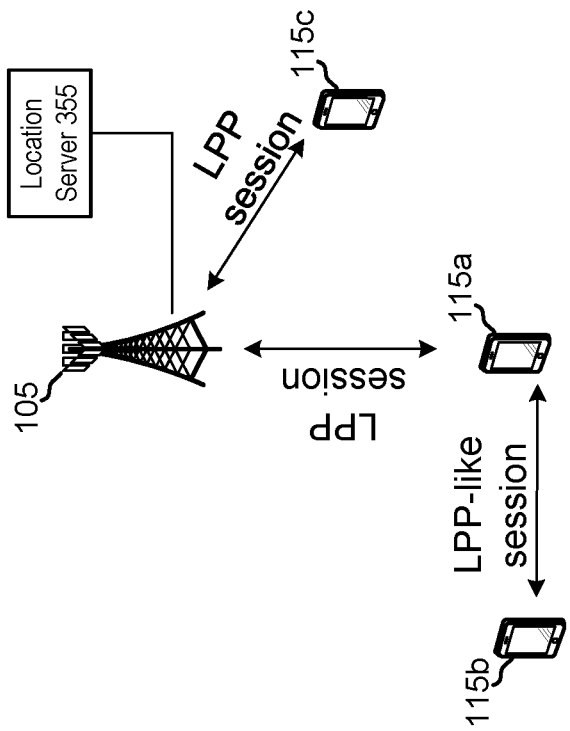
FIG. 4C is a block diagram illustrating another example of determining a joint priority of sidelink and access link PRS transmissions when one or more anchor UEs are outside of coverage of a base station in accordance with aspects of the present disclosure.
Figure 4B:
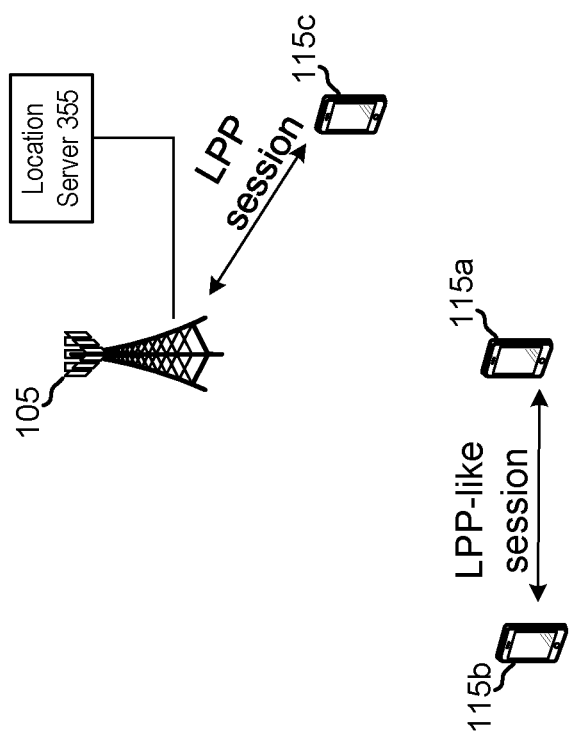
FIG. 4B is a block diagram illustrating an example of determining a joint priority of sidelink and access link PRS transmissions when one or more anchor UEs are outside of coverage of a base station in accordance with aspects of the present disclosure.

In the following discussion, for ease of understanding, operations of wireless communication system 300 for determining a joint priority of sidelink and access link PRS transmissions in accordance with aspects of the present disclosure will be discussed with additional reference to FIGS. 4A and 4B, illustrated two different contexts within which wireless communication system 300 may operate. In a first context, illustrated in FIG. 4A, a target UE (e.g., target UE 115a) and all anchor UEs (e.g., anchor UE 115b and anchor UE 115c) may be within coverage (IC) of a base station (e.g., base station 105). It is noted that, in some cases, the target UE and all anchor UEs may not be IC of a same base station, but in these cases, these UEs are all IC of a base station, even if a different base station. In this manner, target UE 115a and anchor UEs 115b and 115c may be able to communicate with the location server (e.g., location server 355). In a second context, illustrated in FIGS. 4B and 4C, at least one of the anchor UEs (e.g., anchor UE 115b) may be out of coverage (OoC) of any base station. In these cases, the OoC anchor UE may not be able to communicate with a location server. In these cases, target UE 115a may be IC (e.g., as illustrated in FIG. 4A) or OoC (e.g., as illustrated in FIG. 4C).

FIG. 4A is a block diagram illustrating an example of determining a joint priority of sidelink and access link PRS transmissions when all anchor UEs are in coverage of a base station in accordance with aspects of the present disclosure. During operation of wireless communications system 300, such as in the first context (e.g., when target UE 115a and anchor UE 115b are IC) illustrated in FIG. 4A, an LPP session 370 may be initiated between location server 355 and each potential (or candidate) anchor UE (e.g., anchor UEs 115b and 115c). Via the LPP session, a position of each anchor UE 115b and 115c may be determined.

In some aspects, in accordance with aspects of the present disclosure, a new positioning capability may be provisioned to anchor UEs 115*b* and 115*c*. The new positioning capability may be referred to as a "sidelink anchor" capability, and may be defined and provided to location server 355 by anchor UEs 115*b* and 115*c*. For example, via the LPP session, anchor UE 115*b* may transmit sidelink anchor capabilities message 372 indicating a sidelink anchor capability. In aspects, sidelink anchor capabilities message 372 may be an LPP message, such as LPP message "Request Capabilities," LPP message "Provide Capabilities," and/or any other LPP message transmitted to location server 355 by anchor UE 115*b*. In these messages, or other LPP messages, anchor UE 115*b* may indicate a sidelink anchor capability to location server 355. In a similar manner, anchor UE 115*c* may report its sidelink anchor capabilities.

In aspects, sidelink anchor capabilities message 372 received by location server 355 from anchor UE 115*b* may include additional information that may be used by location server 355 to determine a priority associated with sidelink PRS transmissions transmitted by anchor UE 115*b*. In this manner, location server 355 may determine a sidelink PRS priority associated with anchor UE 115*b*. In some aspects, the additional information may be included in (or piggy-backed into) existing LPP messages. In additional or alternative aspects, the additional information may be included in new LPP messages. For example, new LPP messages may be defined for an LPP session (e.g., a "Request Sidelink Information" message to be used for enabling location server 355 to request additional information related to anchor UE 115*b*'s capabilities to being a sidelink anchor, and/or a "Provide Sidelink Information" message to be used by anchor UE 115*b* in response to the Request Sidelink Information for providing the additional information related to anchor UE 115*b*), which may be used to enable the exchange of additional information between anchor UE 115*b* and location server 355. In a similar manner, anchor UE 115*c* may report additional information.

In aspects, the additional information may include information that may assist location server 355 with determining a priority associated with anchor UE 115*b* (and/or anchor UE 115*c*). For example, the additional information may include a mobility of the anchor UE (e.g., high mobility, low mobility, actual mobility, etc.), a positioning reliability (e.g., hardware limitations with respect to positioning determinations, positioning measurement quality and/or accuracy, etc.), etc.

During operation of wireless communications system 300, location server 355 determines a priority associated with PRS transmissions transmitted by an anchor UE. For example, location server 355 may determine a priority associated with sidelink PRS transmissions transmitted by anchor UE 115*b* and/or anchor UE 115*c*. In aspect, location server 355 may determine a priority associated with sidelink PRS transmissions transmitted by an anchor UE based on the sidelink anchor capabilities and/or the additional information reported by the anchor UE.

In aspects, the priority associated with sidelink PRS transmissions transmitted by an anchor UE determined by location server for an anchor UE may be a joint priority. The joint priority may be a priority with respect to PRS transmissions across not only the sidelink but also across the Uu. For example, location server 355 may have knowledge of the priority of Uu PRS transmissions configured to be transmitted to target UE 115*a*, and may determine, in accordance with the above description, a priority of sidelink PRS transmissions configured to be transmitted to target UE 115*a*. Based on this knowledge, location server 355 may determine a joint priority associated with PRS transmissions across Uu and sidelink. In this manner, location server 355 may determine a priority associated with a PRS transmission across all configured Uu and sidelink PRS transmissions. In aspects, the manner of determining joint priorities for particular anchor UEs and/or anchor base stations may be left to the implementation and/or configuration of location server 355.

During operation of wireless communications system 300, location server 355 may configure sidelink PRS transmissions to be transmitted from anchor UEs (e.g., anchor UEs 115*b* and 115*c*) to target UE 115*a* in a current positioning session, and may transmit positioning assistance information 374 to target UE 115*a*. For example, an LPP session may be initiated between target UE 115*a* and location server 355. The LPP session may server to determine a position of target UE 115*a*. As part of the LPP session, positioning assistance information 374 may be transmitted from location server 355 to target UE 115*a*. In aspects, positioning assistance information 374 may be transmitted to target UE 115*a* in an LPP message. In alternative or additional aspects, positioning assistance information 374 may be transmitted to target UE 115*a* in a broadcast data (e.g., a positioning system information block (posSIB) message) to target UE 115*a*.

In aspects, positioning assistance information 374 may include the configuration of the sidelink PRS transmission to be transmitted to target UE 115*a* from anchor UEs 115*b* and 115*c*, and/or configuration of PRS transmissions to be transmitted over the Uu from one or more anchor base stations. In aspects, positioning assistance information 374 may also include an indication of a joint priority for each of the configured PRS transmissions across both the Uu and the sidelink. For example, positioning assistance information 374 may include an indication of the priority associated with PRS transmissions from anchor UE 115*b*, an indication of the priority associated with PRS transmissions from anchor UE 115*c*, and/or an indication of the priority associated with PRS transmissions from anchor base station 105. In one example, the priority associated with PRS transmissions from anchor UE 115*b* may be higher than the priority associated with PRS transmissions from anchor base station 105. In this case, target UE 115*a* may use (e.g., measure and report) the PRS transmissions from anchor UE 115*b* before using the PRS transmissions from anchor base station 105. In this manner, positioning assistance information 374 may include an indication of a joint priority for each PRS transmissions to be transmitted to target UE 115*a*, and the joint priority for each PRS transmissions may indicate a priority with respect to all other PRS transmissions to be transmitted to target UE 115*a* within a current positioning session.

During operation of wireless communications system 300, target UE 115*a* may receive the PRS transmissions over the Uu (e.g., PRS transmission 378) and over the sidelink (e.g., PRS transmission 384). Target UE 115*a* may perform measurements of the PRS transmissions and may report the PRS measurements to location server 355. Location server 355 may determine a position of target UE 115*a* based on the reported PRS measurements. In aspects, target UE 115*a* may perform the measurements of the PRS transmissions and/or may report the measurements to location server 355, in an order based on the joint priority associated with each of the PRS transmissions. For example, the priority associated with PRS transmissions from anchor UE 115*b* may be higher than the priority associated with PRS transmissions from anchor base station 105, which may be higher than the priority associated with PRS transmissions from anchor UE 115c. In this case, target UE 115a may use (e.g., measure and/or report) the PRS transmission received from anchor UE 115b, before using the PRS transmission received from base station 105. In this same example, target UE 115a may use (e.g., measure and/or report) the PRS transmission received from anchor base station 105 before using the PRS transmission received from anchor UE 115c.

FIGS. 4B and 4C are block diagrams illustrating examples of determining a joint priority of sidelink and access link PRS transmissions when one or more anchor UEs are outside of coverage of a base station in accordance with aspects of the present disclosure. During operation of wireless communications system 300, such as in the second context (e.g., when one or more anchors (e.g., anchor UE 115b) is OoC) illustrated in FIGS. 4B and 4C, an anchor UE (e.g., anchor UE 115b) may determine its position. For example, anchor UE 115b may acquire its position from a GNSS, or may be fixed anchor UE with a known position. In aspects, anchor UE 115b may determine a priority associated with PRS transmissions transmitted by anchor UE 115b to a target UE (e.g., target UE 115a). Anchor UE 115b may calculate the priority based on a preconfigured rule. For example, rules may be predetermined for anchor UE 115b to determine the priority, and the rules may be preconfigured to anchor UE 115b. In a similar manner, other OoC anchor UEs may determine a position and/or a priority associated with PRS transmission to target UEs.

In aspects, the OoC anchor UE 115b may provide a report of its sidelink anchor capabilities as well as positioning assistance data to target UE 115a. For example, anchor UE 115b may transmit sidelink anchor capabilities message 382 to target UE 115a. In some aspects, anchor UE 115b may transmit sidelink anchor capabilities message 382 to target UE 115a in responds to target UE 115a requesting the sidelink anchor capabilities report from anchor UE 115b. In aspects, the exchange between target UE 115a and anchor UE 115b (e.g., including the request by target UE 115a for a sidelink anchor capabilities report from anchor UE 115b, and sidelink anchor capabilities message 382 from anchor UE 115b to target UE 115a) may be an exchange of LPP-like messages (e.g., messages following the LPP protocol). In some aspects, the exchange between target UE 115a and anchor UE 115b may be via medium access control (MAC)-control element (CE) and/or sidelink control information (SCI) messages.

In some aspects, instead of anchor UE 115b transmitting sidelink anchor capabilities message 382 directly to target UE 115a, anchor UE 115b transmits sidelink anchor capabilities message 382 to a sidelink hub (not shown). The sidelink hub may be configured to collect information from anchor UE 115b, as well as from other sidelink anchor UEs. The sidelink hub may then transmit the information collected from anchor UE 115b to target UE 115a. In this manner, the sidelink hub may be communicatively coupled with sidelink anchor UEs 115b and/or 115c, and with target UE 115a, in order to serve as a link between the various sidelink UEs (e.g., anchor and target UEs), even if the anchor UE and the target UEs are not connected to each other.

In aspects, when target UE 115a is also OoC, such as in the example illustrated in FIG. 4B, target UE 115a may receive PRS transmissions from OoC anchor UE 115b (e.g., PRS transmission 384), and from other OoC anchor UEs and IC anchor UEs, and may use (e.g., measure and determine a position based on the measurement) the PRS transmissions received over the sidelink (e.g., from OoC anchor UE 115b and from other OoC and IC sidelink anchor UEs) in an order based on the priority received from the sidelink UEs or the sidelink hub associated with each of the sidelink PRS transmissions. For example, target UE 115a may receive positioning assistance information, including an associated priority, from OoC anchor UE 115b (e.g., directly from anchor UE 115b or through a sidelink anchor), as well as from other OoC anchor UEs (not shown), and/or from IC anchor UE 115c. The priority associated with PRS transmissions from anchor UE 115b may be higher than the priority associated with PRS transmissions from anchor UE 115c. In this case, target UE 115a may use (e.g., measure and determine a position based on the measurements) the PRS transmission received from anchor UE 115b before using the PRS transmission received from anchor UE 115c.

In alternative aspects, such as when target UE 115a is within coverage of a base station (e.g., base station 105), as in the example illustrated in FIG. 4C, target UE 115a may transmit sidelink anchor information message 376 to location server 355 (e.g., via base station 105). In aspects, sidelink anchor information message 376 may include at least a portion of the sidelink anchor capabilities information received from OoC anchor UEs, which may include the priority determined by the anchor UEs. For example, sidelink anchor information message 376 may include at least a portion of the information in sidelink anchor capabilities message 382 received from anchor UE 115b, which may include the priority associated with PRS transmissions transmitted by anchor UE 115b, as determined by anchor UE 115b. In some aspects, sidelink anchor information message 376 may be transmitted to location server 355 by target UE 115a in response to a request received by target UE 115a from location server 355 (e.g., a request in an LPP message from location server 355 to target UE 115a).

In aspects, sidelink anchor information message 376 may be included in (or piggybacked into) an existing LPP message (e.g., a "Provide Location Information" LPP message) from target UE 115a to location server 355 during an LPP session between target UE 115a and location server 355. In additional or alternative aspects, sidelink anchor information message 376 may be included in a new LPP message. For example, during the LPP session between target UE 115a and location server 355, location server 355 may transmit a new LPP message (e.g., "Request Sidelink Information") to target UE 115a. In response to receiving the Request Sidelink Information LPP message from location server 355, target UE 115a may forward at least a portion of the sidelink anchor capabilities information received from OoC anchor UEs to location server 355 in a new LPP message (e.g., a "Provide Sidelink Information" LPP message).

In aspects, location server 355 determines a joint priority associated with PRS transmissions transmitted to target UE 115a across the Uu and the sidelink based on the information reported by target UE 115a to location server 355 in sidelink anchor information message 376. As noted above, the joint priority may be a priority with respect to PRS transmissions across not only the sidelink but also across the Uu. For example, location server 355 may determine a joint priority associated with a PRS transmission across all configured Uu and sidelink PRS transmissions to target UE 115a during a current positioning session. In aspects, the manner of determining joint priorities for particular anchor UEs and/or anchor base stations may be left to the implementation and/or configuration of location server 355. In aspects, location server 355 may update the positioning assistance information to be provided to target UE 115a during the current positioning session with the determined joint priority information. Location server 355 may provide the updated positioning assistance information including the determined joint priority information to target UE 115a. For example, location server 355 may transmit the updated positioning assistance information including the determined joint priority information to target UE 115a in an LPP message, and/or in a broadcast data (e.g., a positioning system information block (posSIB) message) to target UE 115a.

During operation of wireless communications system 300, target UE 115a may receive PRS transmissions over the Uu and/or over the sidelink. Target UE 115a may perform measurements of the PRS transmissions and may report the PRS measurements to location server 355. Location server 355 may determine a position of target UE 115a based on the reported PRS measurements. In aspects, target UE 115a may perform the measurements of the PRS transmissions and/or may report the measurements to location server 355, in an order based on the joint priority associated with each of the PRS transmissions. For example, the priority associated with PRS transmissions from anchor UE 115b may be higher than the priority associated with PRS transmissions from anchor base station 105, which may be higher than the priority associated with PRS transmissions from anchor UE 115c. In this case, target UE 115a may use (e.g., measure and/or report) the PRS transmission received from anchor UE 115b, before using the PRS transmission received from base station 105. In this same example, target UE 115a may use (e.g., measure and/or report) the PRS transmission received from anchor base station 105 before using the PRS transmission received from anchor UE 115c.

In some aspects, a priority list may be maintained (e.g., at location server 355) in order to facilitate backward compatibility with UEs that are not configured with or capable of sidelink-assisted positioning. For example, separate lists of priority may be maintained for Uu PRS and sidelink PRS. Each separate list may include the priority associated with PRS transmissions from different anchor nodes over the Uu and the sidelink, respectively. For example, a Uu PRS priority list may indicate the priority associated with PRS transmissions to a target UE over Uu. A sidelink PRS priority list may indicate the priority associated with PRS transmissions to a target UE over the sidelink. In this manner, in addition to, or in the alternative to, a joint priority, a Uu and/or sidelink priority may be specified for each PRS transmissions. Using these separate lists may allow a target UE that is not configured for sidelink-assisted positioning to determine a priority of Uu PRS transmissions with respect to each other, without having to identify sidelink PRS transmissions (e.g., which may be included when joint priority is used). In aspects, when two separate priority lists are configured, an additional parameter or information element may be defined to indicate to a target UE a manner of combining the two separate lists in order to derive and/or determine a joint priority across all the Uu and sidelink PRS transmissions.

Figure 5:
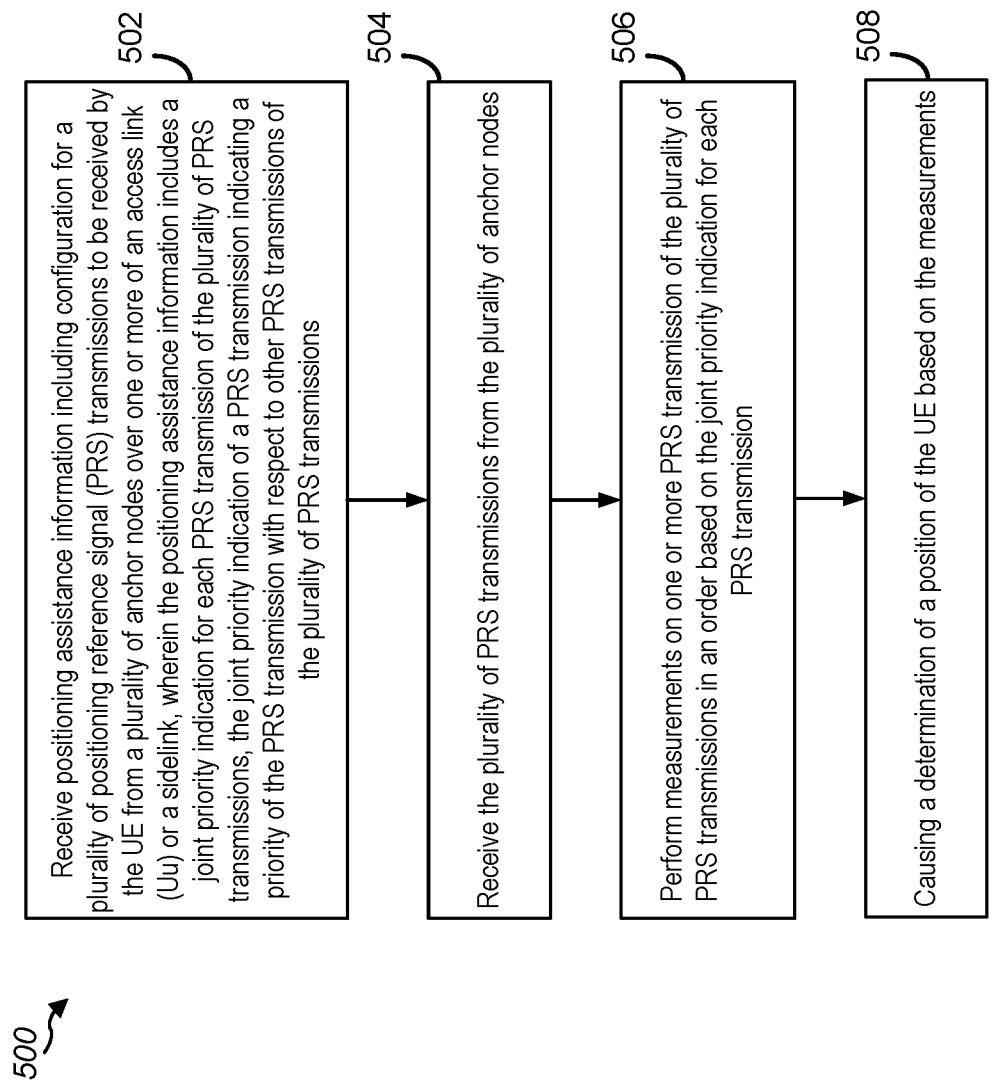
FIG. 5 is a flow diagram illustrating an example process that supports mechanisms for determining a joint priority of sidelink and access link PRS transmissions according to one or more aspects.
Figure 8:
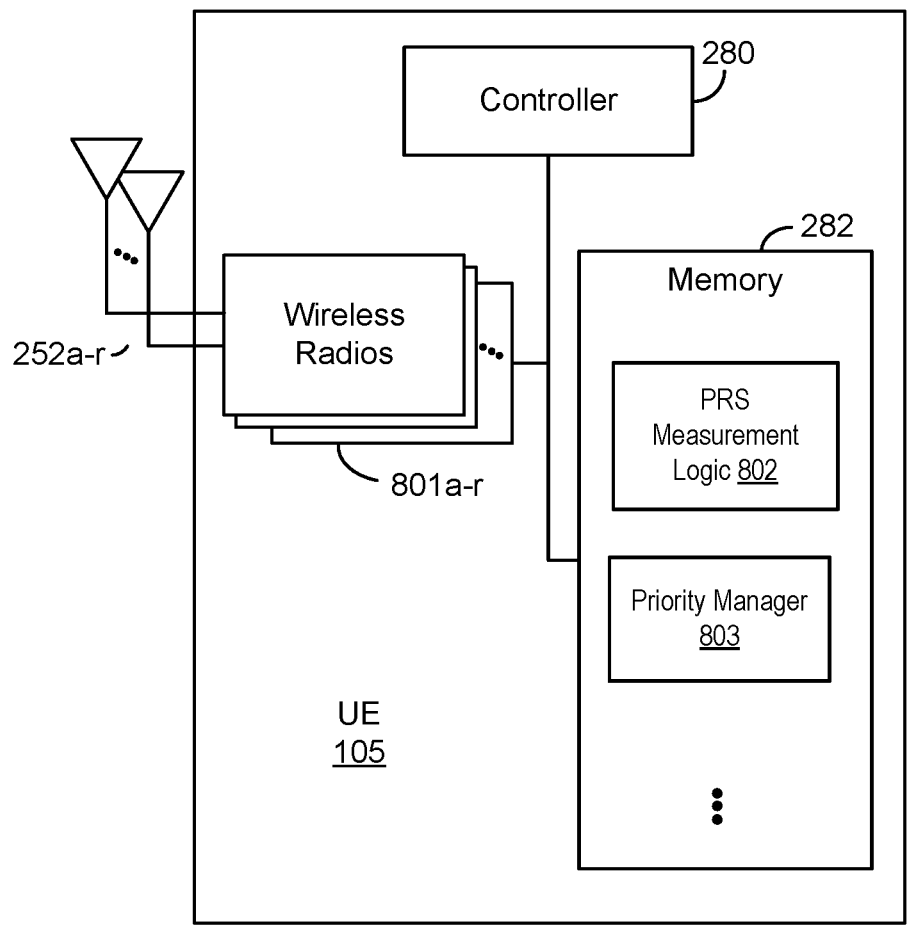
FIG. 8 is a block diagram of an example UE that supports mechanisms for determining a joint priority of sidelink and access link PRS transmissions according to one or more aspects.

FIG. 5 is a flow diagram illustrating an example process 500 that provides for determining a joint priority of sidelink and access link PRS transmissions in a wireless communication system according to one or more aspects. Operations of process 500 may be performed by a UE, such as target UE 115a described above with reference to FIGS. 1-4C. For example, example operations (also referred to as "blocks") of process 500 may enable UE 115 to support mechanisms for determining a joint priority of sidelink and access link PRS transmissions. FIG. 8 is a block diagram illustrating UE 115 configured according to aspects of the present disclosure. UE 115 includes the structure, hardware, and components as illustrated in FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 801a-r and antennas 252a-r. Wireless radios 801a-r includes various components and hardware, as illustrated in FIG. 2, including modulator/demodulators 254a-r, MIMO detector 256, receive processor 258, transmit processor 264, and TX MIMO processor 266.

At block 502 of process 500, a UE (e.g., UE 115 and/or target UE 115a) receives positioning assistance information including configuration for a plurality of PRS transmissions to be received by the UE from a plurality of anchor nodes over one or more of a Uu or a sidelink. In aspects, the positioning assistance information may include a joint priority indication for each PRS transmission of the plurality of PRS transmissions, the joint priority indication of a PRS transmission indicating a priority of the PRS transmission with respect to other PRS transmissions of the plurality of PRS transmissions. In order to implement the functionality for such operations, UE 115, under control of controller/processor 280, may receive the positioning assistance information via wireless radios 801a-r and antennas 252a-r. In aspects, UE 115 may perform operations to receive positioning assistance information including configuration for a plurality of PRS transmissions to be received by the UE from a plurality of anchor nodes over one or more of a Uu or a sidelink according to operations and functionality as described above with reference to target UE 115a and as illustrated in FIGS. 3 and 4A-4C.

At block 504 of process 500, UE 115 receives the plurality of PRS transmissions from the plurality of anchor nodes. In order to implement the functionality for such operations, UE 115, under control of controller/processor 280, may receive the plurality of PRS transmissions from the plurality of anchor nodes via wireless radios 801a-r and antennas 252a-r. In aspects, UE 115 may perform operations to receive the plurality of PRS transmissions from the plurality of anchor nodes according to operations and functionality as described above with reference to target UE 115a and as illustrated in FIGS. 3 and 4A-4C.

At block 506 of process 500, UE 115 performs measurements on one or more PRS transmissions of the plurality of PRS transmissions in an order based on the joint priority indication for each PRS transmission. In order to implement the functionality for such operations, UE 115, under control of controller/processor 280, executes PRS measurement logic 802, stored in memory 282. The functionality implemented through the execution environment of PRS measurement logic 802 allows for UE 115 to perform PRS measurement operations according to the various aspects herein. In aspects, UE 115 may perform operations to perform measurements on one or more PRS transmissions of the plurality of PRS transmissions in an order based on the joint priority indication for each PRS transmission according to operations and functionality as described above with reference to target UE 115a and as illustrated in FIGS. 3 and 4A-4C.

At block 508 of process 500, UE 115 transmits the measurement to a location server for determination of a position of the UE. In order to implement the functionality for such operations, UE 115, under control of controller/processor 280, may transmit the measurement to a location server for determination of a position of the UE via wireless radios 801a-r and antennas 252a-r. In aspects, UE 115 may perform operations to transmit the measurement to a location server for determination of a position of the UE according to operations and functionality as described above with reference to target UE 115a and as illustrated in FIGS. 3 and 4A-4C.

Figure 6:
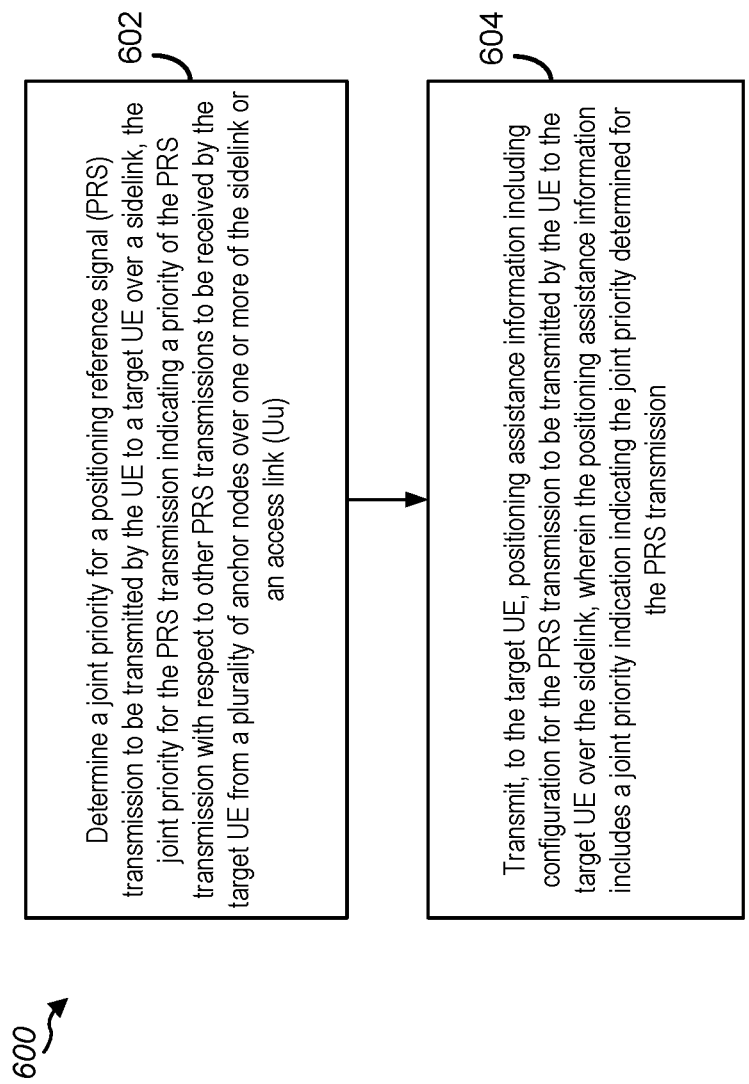
FIG. 6 is another flow diagram illustrating an example process that supports mechanisms for determining a joint priority of sidelink and access link PRS transmissions according to one or more aspects.

FIG. 6 is a flow diagram illustrating an example process 600 that provides for determining a joint priority of sidelink and access link PRS transmissions in a wireless communication system according to one or more aspects. Operations of process 600 may be performed by a UE, such as anchor UE 115b described above with reference to FIGS. 1-4C. For example, example operations (also referred to as "blocks") of process 600 may enable UE 115 (e.g., UE 115 of FIG. 8) to support mechanisms for determining a joint priority of sidelink and access link PRS transmissions.

At block 602 of process 600, a UE (e.g., UE 115 and/or anchor UE 115b) determines a joint priority for a PRS transmission to be transmitted by the UE to a target UE over a sidelink. In aspects, the joint priority for the PRS transmission indicates a priority of the PRS transmission with respect to other PRS transmissions to be received by the target UE from a plurality of anchor nodes over one or more of the sidelink or a Uu link. In order to implement the functionality for such operations, UE 115, under control of controller/processor 280, executes priority manager 803, stored in memory 282. The functionality implemented through the execution environment of priority manager 803 allows for UE 115 to perform joint priority determination operations according to the various aspects herein. In aspects, UE 115 may perform operations to determine a joint priority for a PRS transmission to be transmitted by the UE to a target UE over a sidelink according to operations and functionality as described above with reference to target UE 115a and as illustrated in FIGS. 3 and 4A-4C.

At block 604 of process 600, UE 115 transmits, to the target UE, positioning assistance information including configuration for the PRS transmission to be transmitted by the UE to the target UE over the sidelink. In aspects, the positioning assistance information includes a joint priority indication indicating the joint priority determined for the PRS transmission. In order to implement the functionality for such operations, UE 115, under control of controller/processor 280, may transmit positioning assistance information to the target UE via wireless radios 801a-r and antennas 252a-r. In aspects, UE 115 may perform operations to transmit positioning assistance information to the target UE according to operations and functionality as described above with reference to target UE 115a and as illustrated in FIGS. 3 and 4A-4C.

Figure 7:
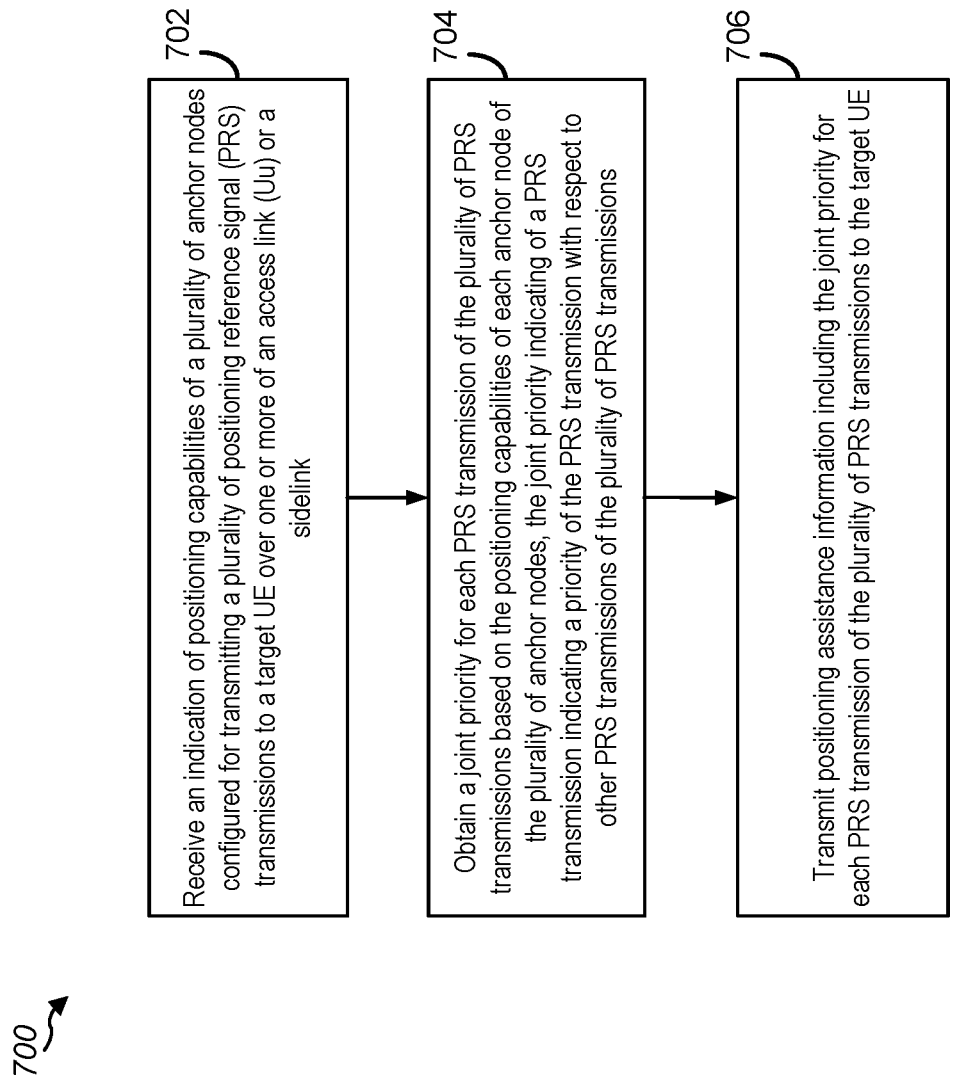
FIG. 7 is another flow diagram illustrating an example process that supports mechanisms for determining a joint priority of sidelink and access link PRS transmissions according to one or more aspects.
Figure 9:
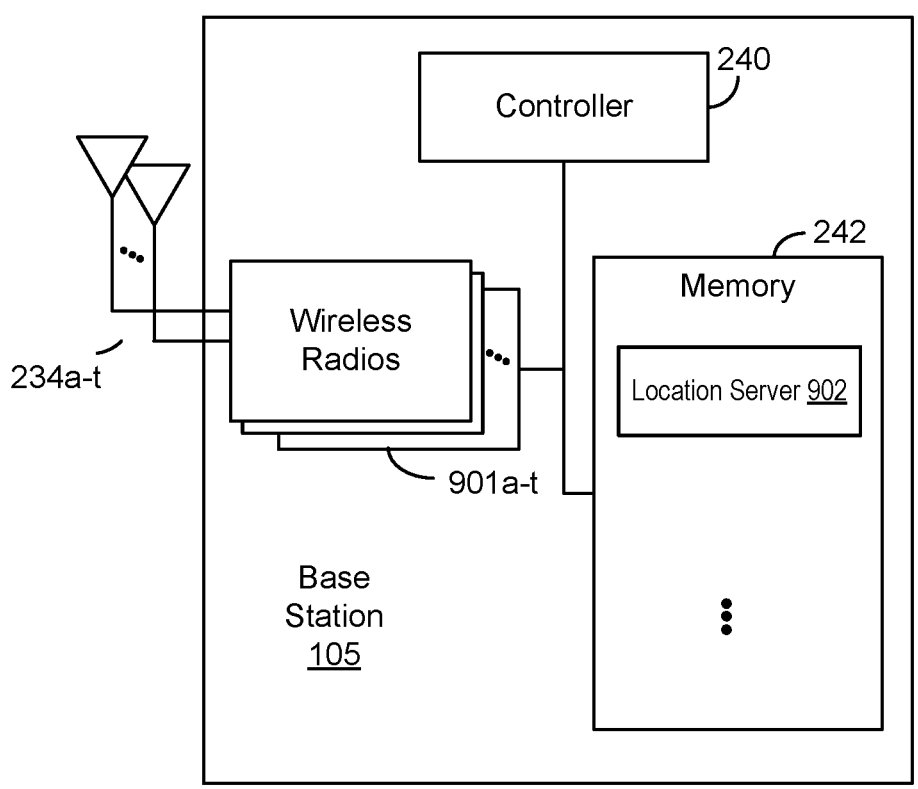
FIG. 9 is a block diagram of an example base station that supports mechanisms for determining a joint priority of sidelink and access link PRS transmissions according to one or more aspects.

FIG. 7 is a block diagram illustrating an example an example process 700 that provides for determining a joint priority of sidelink and access link PRS transmissions in a wireless communication system according to one or more aspects. Operations of process 700 may be performed by a base station, such as base station 105 described above with reference to FIGS. 1-4C, or described with reference to FIG. 9. FIG. 9 is a block diagram illustrating base station 105 configured according to one aspect of the present disclosure. Base station 105 includes the structure, hardware, and components as illustrated for base station 105 of FIG. 2. For example, base station 105 includes controller/processor 240, which operates to execute logic or computer instructions stored in memory 242, as well as controlling the components of base station 105 that provide the features and functionality of base station 105. Base station 105, under control of controller/processor 240, transmits and receives signals via wireless radios 901a-t and antennas 234a-t. Wireless radios 901a-t includes various components and hardware, as illustrated in FIG. 2 for base station 105, including modulator/demodulators 232a-t, MIMO detector 236, receive processor 238, transmit processor 220, and TX MIMO processor 230.

At block 702 of process 700, a base station (e.g., base station 105) receives an indication of positioning capabilities of a plurality of anchor nodes configured for transmitting a plurality of PRS transmissions to a target UE over one or more of a Uu link or a sidelink. In order to implement the functionality for such operations, the base station, under control of controller/processor 240, may receive the indication of positioning capabilities of a plurality of anchor nodes configured for transmitting a plurality of PRS transmissions to a target UE over one or more of a Uu link or a sidelink via wireless radios 701a-r and antennas 234a-t. In aspects, base station 105 may perform operations to receive the indication of positioning capabilities of a plurality of anchor nodes configured for transmitting a plurality of PRS transmissions to a target UE over one or more of a Uu link or a sidelink according to operations and functionality as described above with reference to base station 105 and as illustrated in FIGS. 3 and 4A-4C.

At block 704 of process 700, base station 105 obtains a joint priority for each PRS transmission of the plurality of PRS transmissions based on the positioning capabilities of each anchor node of the plurality of anchor nodes. In aspects, the joint priority indicates of a PRS transmission indicating a priority of the PRS transmission with respect to other PRS transmissions of the plurality of PRS transmissions. In order to implement the functionality for such operations, base station 105, under control of controller/processor 240, executes location server 902, stored in memory 242, or causes an external location server to execute. The functionality implemented through the execution environment of location server 902, or through the execution of the external location server, allows for base station 105 to perform operations for obtaining the joint priority for each PRS transmission of the plurality of PRS transmissions according to the various aspects herein. In aspects, base station 105 may perform operations for obtaining the joint priority for each PRS transmission of the plurality of PRS transmissions according to operations and functionality as described above with reference to base station 105 and as illustrated in FIGS. 3 and 4A-4C.

At block 706 of process 700, base station 105 transmits positioning assistance information including the joint priority for each PRS transmission of the plurality of PRS transmissions to the target UE. In order to implement the functionality for such operations, the base station, under control of controller/processor 240, may transmit positioning assistance information including the joint priority for each PRS transmission of the plurality of PRS transmissions to the target UE via wireless radios 701a-r and antennas 234a-t. In aspects, base station 105 may perform operations to transmit positioning assistance information including the joint priority for each PRS transmission of the plurality of PRS transmissions to the target UE according to operations and functionality as described above with reference to base station 105 and as illustrated in FIGS. 3 and 4A-4C.

In one or more aspects, techniques for supporting mechanisms for determining a joint priority of sidelink and access link PRS transmissions in a wireless communication system according to one or more aspects may include additional aspects, such as any single aspect or any combination of aspects described below or in connection with one or more other processes or devices described elsewhere herein. In a first aspect, supporting mechanisms for determining a joint priority of sidelink and access link PRS transmissions in a wireless communication system may include an apparatus configured to receive positioning assistance information including configuration for a plurality of PRS transmissions to be received by the UE from a plurality of anchor nodes over one or more of a Uu link or a sidelink. In this aspect, the positioning assistance information includes a joint priority indication for each PRS transmission of the plurality of PRS transmissions, the joint priority indication of a PRS transmission indicating a priority of the PRS transmission with respect to other PRS transmissions of the plurality of PRS transmissions. The apparatus is further configured to receive the plurality of PRS transmissions from the plurality of anchor nodes, to perform measurements on one or more PRS transmissions of the plurality of PRS transmissions in an order based on the joint priority indication for each PRS transmission, and to transmit the measurement to a location server for determination of a position of the UE. Additionally, the apparatus may perform or operate according to one or more aspects as described below. In some implementations, the apparatus includes a wireless device, such as a UE (e.g., a target UE as described above). In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a second aspect, alone or in combination with the first aspect, the plurality of anchor nodes includes an anchor base station and/or an anchor UE.

In a third aspect, alone or in combination with the second aspect, at least one PRS transmission of the plurality of PRS transmissions is transmitted from the base station to the UE over the Uu.

In a fourth aspect, alone or in combination with one or more of the second aspect through the third aspect, at least one PRS transmission of the plurality of PRS transmissions is transmitted from the anchor UE to the UE over the sidelink.

In a fifth aspect, alone or in combination with one or more of the first aspect through the fourth aspect, the plurality of anchor nodes includes one or more anchor UEs, wherein the UE and the one or more anchor UEs are within coverage of at least one base station.

In a sixth aspect, alone or in combination with the fifth aspect, the positioning assistance information is received from the location server via a base station in an LPP session message, and/or a posSIB transmission.

In a seventh aspect, alone or in combination with one or more of the first aspect through the sixth aspect, the plurality of anchor nodes includes one or more anchor UEs that are outside coverage of at least one base station.

In an eighth aspect, alone or in combination with the seventh aspect, the one or more anchor UEs are configured to determine a joint priority associated with each of PRS transmissions to be transmitted from the one or more anchor UEs to the UE.

In a ninth aspect, alone or in combination with one or more of the first aspect through the eighth aspect, receiving the positioning assistance information includes receiving at least a portion of the positioning assistance information from the one or more anchor UEs over the sidelink, the at least a portion of the positioning assistance information including an indication of the joint priority associated with each of the PRS transmissions to be transmitted from the one or more anchor UEs to the UE.

In a tenth aspect, alone or in combination with the ninth aspect, receiving the positioning assistance information includes receiving the at least a portion of the positioning assistance information from a hub configured to receive the at least a portion of the positioning assistance information from the one or more anchor UEs.

In an eleventh aspect, alone or in combination with one or more of the first aspect through the tenth aspect, the UE is outside coverage of at least one base station.

In a twelfth aspect, alone or in combination with the eleventh aspect, causing a determination of a position of the UE includes determining the location of the UE based on the measurements.

In a thirteenth aspect, alone or in combination with one or more of the first aspect through the twelfth aspect, the UE is within coverage of at least one base station.

In a fourteenth aspect, alone or in combination with the thirteenth aspect, the techniques of the first aspect include transmitting the at least a portion of the positioning assistance information received from the one or more anchor UEs to the location server.

In a fifteenth aspect, alone or in combination with one or more of the first aspect through the fourteenth aspect, receiving the positioning assistance information further includes receiving the positioning assistance information from the location server, the positioning assistance information including the joint priority indication for each PRS transmission of the plurality of PRS transmissions.

In a sixteenth aspect, alone or in combination with the fifteenth aspect, the joint priority indication for each PRS transmission of the plurality of PRS transmissions is determined by the at least one base station based, at least in part, on the at least a portion of the positioning assistance information including the indication of the joint priority associated with each of the PRS transmissions to be transmitted from the one or more anchor UEs to the UE.

In a seventeenth aspect, alone or in combination with one or more of the first aspect through the sixteenth aspect, the plurality of anchor nodes includes the at least one base station.

In an eighteenth aspect, alone or in combination with the seventeenth aspect, the positioning assistance information includes a joint priority indication associated with each of PRS transmissions to be transmitted from the at least one base station to the UE.

In a nineteenth aspect, alone or in combination with one or more of the seventeenth aspect through the eighteenth aspect, the joint priority indication for each PRS transmission of the plurality of PRS transmissions is determined by the at least one base station further based, at least in part, on the joint priority indication associated with each of PRS transmissions to be transmitted from the at least one base station to the UE.

In a twentieth aspect, techniques for supporting mechanisms for determining a joint priority of sidelink and access link PRS transmissions in a wireless communication system may include an apparatus configured to determine a joint priority for a PRS transmission to be transmitted by the UE to a target UE over a sidelink. In this aspect, the joint priority for the PRS transmission indicates a priority of the PRS transmission with respect to other PRS transmissions to be received by the target UE from a plurality of anchor nodes over one or more of the sidelink or a Uu link. The apparatus is further configured to transmit, to the target UE, positioning assistance information including configuration for the PRS transmission to be transmitted by the UE to the target UE over the sidelink. In this aspect, the positioning assistance information includes a joint priority indication indicating the joint priority determined for the PRS transmission. Additionally, the apparatus may perform or operate according to one or more aspects as described below. In some implementations, the apparatus includes a wireless device, such as a UE (e.g., an anchor UE as described above). In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a twenty-first aspect, alone or in combination with one or more of the twentieth aspect through the twentieth aspect, the plurality of anchor nodes includes an anchor base station and/or an anchor UE.

In a twenty-second aspect, alone or in combination with the twenty-first aspect, at least one PRS transmission of the plurality of PRS transmissions is transmitted from the base station to the UE over the Uu.

In a twenty-third aspect, alone or in combination with one or more of the twenty-first aspect through the twenty-second aspect, at least one PRS transmission of the plurality of PRS transmissions is transmitted from the anchor UE to the UE over the sidelink.

In a twenty-fourth aspect, alone or in combination with one or more of the twentieth aspect through the twenty-third aspect, the UE and the target UE are within coverage of at least one base station.

In a twenty-fifth aspect, alone or in combination with one or more of the twentieth aspect through the twenty-fourth aspect, transmitting the positioning assistance information to the target UE includes transmitting the positioning assistance information to the target UE via a location server and the at least one base station in an LPP session message, and/or a posSIB transmission.

In a twenty-sixth aspect, alone or in combination with one or more of the twentieth aspect through the twenty-fifth aspect, the UE is outside coverage of at least one base station.

In a twenty-seventh aspect, alone or in combination with the twenty-sixth aspect, the techniques of the twentieth aspect include determining the joint priority associated with the PRS transmission to be transmitted to the target UE.

In a twenty-eighth aspect, alone or in combination with one or more of the twentieth aspect through the twenty-seventh aspect, transmitting the positioning assistance information includes transmitting the positioning assistance information directly to the target UE.

In a twenty-ninth aspect, alone or in combination with the twenty-eighth aspect, transmitting the positioning assistance information includes transmitting the positioning assistance information to a hub configured to receive the positioning assistance information from the UE.

In a thirtieth aspect, alone or in combination with one or more of the twentieth aspect through the twenty-ninth aspect, determining the joint priority for the PSR transmission includes transmitting an indication of positioning capabilities of the UE to a location server via a base station.

In a thirty-first aspect, alone or in combination with the thirtieth aspect, the location server is configured to determine the joint priority associated with the PRS transmission to be transmitted to the target UE based on the indication of the positioning capabilities of the UE.

In a thirty-second aspect, techniques for supporting mechanisms for determining a joint priority of sidelink and access link PRS transmissions in a wireless communication system may include an apparatus configured to receive an indication of positioning capabilities of a plurality of anchor nodes configured for transmitting a plurality of PRS transmissions to a target UE over one or more of a Uu link or a sidelink, to obtain a joint priority for each PRS transmission of the plurality of PRS transmissions based on the positioning capabilities of each anchor node of the plurality of anchor nodes, the joint priority indicating of a PRS transmission indicating a priority of the PRS transmission with respect to other PRS transmissions of the plurality of PRS transmissions, and to transmit positioning assistance information including the joint priority for each PRS transmission of the plurality of PRS transmissions to the target UE. Additionally, the apparatus may perform or operate according to one or more aspects as described below. In some implementations, the apparatus includes a wireless device, such as a base station. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a thirty-third aspect, alone or in combination with one or more of the thirty-second aspect through the thirty-second aspect, the plurality of anchor nodes includes one or more anchor UEs.

In a thirty-fourth aspect, alone or in combination with the thirty-third aspect, the target UE and the one or more anchor UEs are within coverage of the base station.

In a thirty-fifth aspect, alone or in combination with one or more of the thirty-third aspect through the thirty-fourth aspect, the positioning assistance information is transmitted to the target UE via in an LPP session message, and/or a posSIB transmission.

In a thirty-sixth aspect, alone or in combination with one or more of the thirty-second aspect through the thirty-fifth aspect, receiving the indication of positioning capabilities of the plurality of anchor nodes includes receiving at least a portion of the positioning capabilities of the plurality of anchor nodes from the target UE when the target UE is within coverage of the base station and at least one anchor node of the plurality of anchor nodes is out of coverage of the base station, and/or receiving a least a portion of the positioning capabilities of the plurality of anchor nodes from one or more anchor nodes of the plurality of anchor nodes when at least one anchor node of the plurality of anchor nodes is within coverage of the base station.

In a thirty-seventh aspect, alone or in combination with one or more of the thirty-second aspect through the thirty-sixth aspect, transmitting the positioning assistance information to the target UE includes receiving the positioning assistance information from a location server.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-9 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A user equipment (UE), comprising:
   at least one processor; and
   a memory coupled to the at least one processor, the at least one processor storing processor-readable code that, when executed by the at least one processor, is configured to perform operations including:
   receiving positioning assistance information including configuration for a plurality of positioning reference signal (PRS) transmissions to be received by the UE from a plurality of anchor nodes over one or more of an access link (Uu) or a sidelink, wherein the positioning assistance information includes a joint priority indication for each PRS transmission of the plurality of PRS transmissions, the joint priority indication of a PRS transmission indicating a priority of the PRS transmission with respect to other PRS transmissions of the plurality of PRS transmissions;
   receiving the plurality of PRS transmissions from the plurality of anchor nodes;
   performing measurements on one or more PRS transmissions of the plurality of PRS transmissions in an order based on the joint priority indication for each PRS transmission; and
   causing a determination of a position of the UE based on the measurements.

2. The UE of claim 1, wherein the plurality of anchor nodes includes one or more of:
   an anchor base station, wherein at least one PRS transmission of the plurality of PRS transmissions is transmitted from the base station to the UE over the Uu; or
   an anchor UE, wherein at least one PRS transmission of the plurality of PRS transmissions is transmitted from the anchor UE to the UE over the sidelink.

3. The UE of claim 1, wherein the plurality of anchor nodes includes one or more anchor UEs, wherein the UE and the one or more anchor UEs are within coverage of at least one base station, and wherein the positioning assistance information is received from a location server via a base station in one or more of: a long term evolution (LTE) positioning protocol (LPP) session message, or a positioning system information block (posSIB) transmission.

4. The UE of claim 1, wherein the plurality of anchor nodes includes one or more anchor UEs that are outside coverage of at least one base station, wherein the one or more anchor UEs are configured to determine a joint priority associated with each of PRS transmissions to be transmitted from the one or more anchor UEs to the UE.

5. The UE of claim 4, wherein receiving the positioning assistance information includes:
   receiving at least a portion of the positioning assistance information from the one or more anchor UEs over the sidelink, the at least a portion of the positioning assistance information including an indication of the joint priority associated with each of the PRS transmissions to be transmitted from the one or more anchor UEs to the UE; or receiving the at least a portion of the positioning assistance information from a hub configured to receive the at least a portion of the positioning assistance information from the one or more anchor UEs.

6. The UE of claim 5, wherein the UE is outside coverage of at least one base station, and wherein causing a determination of a position of the UE includes determining the location of the UE based on the measurements.

7. The UE of claim 5, wherein the UE is within coverage of at least one base station, further comprising:
transmitting the at least a portion of the positioning assistance information received from the one or more anchor UEs to a location server.

8. The UE of claim 7, wherein receiving the positioning assistance information further includes:
receiving the positioning assistance information from the location server, the positioning assistance information including the joint priority indication for each PRS transmission of the plurality of PRS transmissions, wherein the joint priority indication for each PRS transmission of the plurality of PRS transmissions is determined by the at least one base station based, at least in part, on the at least a portion of the positioning assistance information including the indication of the joint priority associated with each of the PRS transmissions to be transmitted from the one or more anchor UEs to the UE.

9. The UE of claim 8, wherein the plurality of anchor nodes includes the at least one base station, wherein the positioning assistance information includes a joint priority indication associated with each of PRS transmissions to be transmitted from the at least one base station to the UE, and wherein the joint priority indication for each PRS transmission of the plurality of PRS transmissions is determined by the at least one base station further based, at least in part, on the joint priority indication associated with each of PRS transmissions to be transmitted from the at least one base station to the UE.

10. A user equipment (UE), comprising:
at least one processor; and
a memory coupled to the at least one processor, the at least one processor storing processor-readable code that, when executed by the at least one processor, is configured to perform operations including:
determining a joint priority for a positioning reference signal (PRS) transmission to be transmitted by the UE to a target UE over a sidelink, the joint priority for the PRS transmission indicating a priority of the PRS transmission with respect to other PRS transmissions to be received by the target UE from a plurality of anchor nodes over one or more of the sidelink or an access link (Uu); and
transmitting, to the target UE, positioning assistance information including configuration for the PRS transmission to be transmitted by the UE to the target UE over the sidelink, wherein the positioning assistance information includes a joint priority indication indicating the joint priority determined for the PRS transmission.

11. The UE of claim 10, wherein the plurality of anchor nodes includes one or more of:
an anchor base station, wherein at least one PRS transmission of the other PRS transmissions is transmitted from the base station to the target UE over the Uu; or
an anchor UE, wherein at least one PRS transmission of the other PRS transmissions is transmitted from the anchor UE to the target UE over the sidelink.

12. The UE of claim 10, wherein the UE and the target UE are within coverage of at least one base station, and wherein transmitting the positioning assistance information to the target UE includes transmitting the positioning assistance information to the target UE via a location server and the at least one base station in one or more of: a long term evolution (LTE) positioning protocol (LPP) session message, or a positioning system information block (posSIB) transmission.

13. The UE of claim 10, wherein the UE is outside coverage of at least one base station, further comprising:
determining the joint priority associated with the PRS transmission to be transmitted to the target UE.

14. The UE of claim 13, wherein transmitting the positioning assistance information includes:
transmitting the positioning assistance information directly to the target UE; or
transmitting the positioning assistance information to a hub configured to receive the positioning assistance information from the UE.

15. The UE of claim 10, wherein determining the joint priority for the PSR transmission includes:
transmitting an indication of positioning capabilities of the UE to a location server via a base station, wherein the location server is configured to determine the joint priority associated with the PRS transmission to be transmitted to the target UE based on the indication of the positioning capabilities of the UE.

16. A base station, comprising:
at least one processor; and
a memory coupled to the at least one processor, the at least one processor storing processor-readable code that, when executed by the at least one processor, is configured to perform operations including:
receiving an indication of positioning capabilities of a plurality of anchor nodes configured for transmitting a plurality of positioning reference signal (PRS) transmissions to a target UE over one or more of an access link (Uu) or a sidelink;
obtaining a joint priority for each PRS transmission of the plurality of PRS transmissions based on the positioning capabilities of each anchor node of the plurality of anchor nodes, the joint priority indicating of a PRS transmission indicating a priority of the PRS transmission with respect to other PRS transmissions of the plurality of PRS transmissions; and
transmitting positioning assistance information including the joint priority for each PRS transmission of the plurality of PRS transmissions to the target UE.

17. The base station of claim 16, wherein the plurality of anchor nodes includes one or more anchor UEs, wherein the target UE and the one or more anchor UEs are within coverage of the base station, and wherein the positioning assistance information is transmitted to the target UE via in one or more of: a long term evolution (LTE) positioning protocol (LPP) session message, or a positioning system information block (posSIB) transmission.

18. The base station of claim 17, wherein receiving the indication of positioning capabilities of the plurality of anchor nodes includes one or more:
receiving at least a portion of the positioning capabilities of the plurality of anchor nodes from the target UE when the target UE is within coverage of the base station and at least one anchor node of the plurality of anchor nodes is out of coverage of the base station; or
receiving a least a portion of the positioning capabilities of the plurality of anchor nodes from one or more anchor nodes of the plurality of anchor nodes when at least one anchor node of the plurality of anchor nodes is within coverage of the base station.

19. The base station of claim 18, wherein transmitting the positioning assistance information to the target UE includes:
receiving the positioning assistance information from a location server.

20. A method of wireless communication performed by a user equipment (UE), the method comprising:
receiving positioning assistance information including configuration for a plurality of positioning reference signal (PRS) transmissions to be received by the UE from a plurality of anchor nodes over one or more of an access link (Uu) or a sidelink, wherein the positioning assistance information includes a joint priority indication for each PRS transmission of the plurality of PRS transmissions, the joint priority indication of a PRS transmission indicating a priority of the PRS transmission with respect to other PRS transmissions of the plurality of PRS transmissions;
receiving the plurality of PRS transmissions from the plurality of anchor nodes;
performing measurements on one or more PRS transmissions of the plurality of PRS transmissions in an order based on the joint priority indication for each PRS transmission; and
causing a determination of a position of the UE based on the measurements.

21. The method of claim 20, wherein the plurality of anchor nodes includes one or more of:
an anchor base station, wherein at least one PRS transmission of the plurality of PRS transmissions is transmitted from the base station to the UE over the Uu; or
an anchor UE, wherein at least one PRS transmission of the plurality of PRS transmissions is transmitted from the anchor UE to the UE over the sidelink.

22. The method of claim 20, wherein the plurality of anchor nodes includes one or more anchor UEs, wherein the UE and the one or more anchor UEs are within coverage of at least one base station, and wherein the positioning assistance information is received from the location server via a base station in one or more of: a long term evolution (LTE) positioning protocol (LPP) session message, or a positioning system information block (posSIB) transmission.

23. The method of claim 20, wherein the plurality of anchor nodes includes one or more anchor UEs that are outside coverage of at least one base station, wherein the one or more anchor UEs are configured to determine a joint priority associated with each of PRS transmissions to be transmitted from the one or more anchor UEs to the UE.

24. The method of claim 23, wherein receiving the positioning assistance information includes:
receiving at least a portion of the positioning assistance information from the one or more anchor UEs over the sidelink, the at least a portion of the positioning assistance information including an indication of the joint priority associated with each of the PRS transmissions to be transmitted from the one or more anchor UEs to the UE; or
receiving the at least a portion of the positioning assistance information from a hub configured to receive the at least a portion of the positioning assistance information from the one or more anchor UEs.

25. The method of claim 24, wherein the UE is outside coverage of at least one base station, and wherein causing a determination of a position of the UE includes determining the location of the UE based on the measurements.

26. The method of claim 24, wherein the UE is within coverage of at least one base station, further comprising:
transmitting the at least a portion of the positioning assistance information received from the one or more anchor UEs to the location server.

27. The method of claim 26, wherein receiving the positioning assistance information further includes:
receiving the positioning assistance information from the location server, the positioning assistance information including the joint priority indication for each PRS transmission of the plurality of PRS transmissions, wherein the joint priority indication for each PRS transmission of the plurality of PRS transmissions is determined by the at least one base station based, at least in part, on the at least a portion of the positioning assistance information including the indication of the joint priority associated with each of the PRS transmissions to be transmitted from the one or more anchor UEs to the UE.

28. The method of claim 27, wherein the plurality of anchor nodes includes the at least one base station, wherein the positioning assistance information includes a joint priority indication associated with each of PRS transmissions to be transmitted from the at least one base station to the UE, and wherein the joint priority indication for each PRS transmission of the plurality of PRS transmissions is determined by the at least one base station further based, at least in part, on the joint priority indication associated with each of PRS transmissions to be transmitted from the at least one base station to the UE.

* * * * *